(12) United States Patent
Weinstein et al.

(10) Patent No.: US 7,911,373 B2
(45) Date of Patent: Mar. 22, 2011

(54) COMPACT ACTIVE PHASED ARRAY ANTENNA FOR RADARS

(76) Inventors: Hillel Weinstein Weinstein, Tel-Aviv (IL); Alberto Milano, Rehovot (IL)

( * ) Notice: Subject to any disclaimer, the term of this patent is extended or adjusted under 35 U.S.C. 154(b) by 299 days.

(21) Appl. No.: 12/185,092

(22) Filed: Aug. 3, 2008

(65) Prior Publication Data

US 2010/0052975 A1  Mar. 4, 2010

(30) Foreign Application Priority Data

Aug. 9, 2007 (IL) .......................................... 185186

(51) Int. Cl.
*G01S 13/66* (2006.01)
(52) U.S. Cl. ............... 342/62; 342/81; 342/97; 342/157
(58) Field of Classification Search .................... 342/62, 342/74, 76–81, 90, 95–97, 139–141, 157–158, 342/368, 371–372
See application file for complete search history.

(56) References Cited

U.S. PATENT DOCUMENTS

| | | | | | |
|---|---|---|---|---|---|
| 4,630,050 | A | * | 12/1986 | Johnson | 342/62 |
| 5,220,330 | A | * | 6/1993 | Salvail et al. | 342/62 |
| 5,455,587 | A | * | 10/1995 | Schneider | 342/62 |
| 7,504,982 | B2 | * | 3/2009 | Berg et al. | 342/13 |
| 7,800,453 | B2 | * | 9/2010 | Milano | 331/34 |
| 2003/0132875 | A1 | * | 7/2003 | Goebel et al. | 342/25 |
| 2010/0052975 | A1 | * | 3/2010 | Milano et al. | 342/175 |
| 2010/0194629 | A1 | * | 8/2010 | Craig et al. | 342/354 |

* cited by examiner

*Primary Examiner* — John B Sotomayor
(74) *Attorney, Agent, or Firm* — Soroker Agmon Advocates & Patent Attorneys

(57) ABSTRACT

A radar system, including: a compact, active phased array antenna for transmission and reception of a focused radiation beam, circuits for providing signals to produce or detect a radiation beam by the phased array antenna and to control or detect the direction of the radiation beam, and wherein the radar is adapted to be mounted on a missile and scan a selected area proceeding the direction of motion of the missile.

15 Claims, 11 Drawing Sheets

11000

5 BIT WORD GENERATOR

COMPACT ACTIVE PHASED ARRAY ANTENNA FOR RADARS

FIELD OF THE INVENTION

The present invention relates generally to a compact active phased array antenna that is incorporated in a radar to scan the horizon with a focused radiation beam.

BACKGROUND OF THE INVENTION

Conventional phased array radars are generally expensive and bulky systems. Typically a phased array radar incorporates microwave T/R modules to drive phased array antennas and produce narrow radiation beams. The resulting phased array radar generally requires a lot of power and a cooling system to cool the radar in order to prevent meltdown and/or malfunction of the radar components. As a result phased array radar systems are either located in a stationary building or provided as a system located on a large motorized vehicle (e.g. a truck) or located in a large air-born vehicle.

In PCT/IL2006/001144 filed on Oct. 3, 2006 and in PCT/IL2006/001039 filed on Sep. 6, 2006 the disclosures of which are incorporated herein by reference there are described elements and circuit designs for providing low cost and light weight phased array antennas. The applications describe circuits, which can be implemented as low cost, small sized circuits with low power requirements or even manufactured as integrated chips to handle the signals transmitted and detected by phased array radar antennas, instead of using antennas with T/R modules.

The use of lightweight low cost phased array antennas with low power requirements enables using phased array radars for many applications, which previously would have been impossible or unfeasible, for example incorporating a phased array radar on an exploding missile, or on a small vehicle such as a bicycle or motor cycle. The low cost makes it feasible for the radar to be implemented in disposable items or in mass produced products. Low power consumption reduces the size and weight requirements of the power sources that are needed to support the radar.

When implementing a low power lightweight phased array radar that is controlled by an integrated circuit and/or low powered circuit, the signal provided to each radiator results from a low powered signal and is limited in power and range. Thus in order to produce a specific radiation beam with a specific intensity there is a need to design an antenna with multiple radiators which are synchronized relative to each other and positioned in a specific pattern.

SUMMARY OF THE INVENTION

An aspect of the invention relates to a compact phased array radar that can be mounted on a missile and is adapted to scan the horizon with a focused beam to detect targets. In some embodiment of the invention, the phased array radar scans the entire horizon repetitively to locate targets. Alternatively or additionally, the phased array radar receives coordinates of a limited region and scans the limited region repetitively. In some embodiments of the invention, once a target is detected the phased array radar tracks the motion of the target relative to the missile. Optionally, the phased array radar controls the motion of the missile responsive to the tracking of the phased array radar.

In an exemplary embodiment of the invention, the phased array radar comprises an antenna that is made up from a plurality of row elements, wherein each row element has a row of radiators on an elongated surface and an internal circuit to control the radiation pattern produced by the row of radiators. Optionally, all row elements are provided with an identical base signal to produce the focused radiation beam. In an exemplary embodiment of the invention, the plurality of row elements are positioned one on top of another in one or more cascades with the row of radiators uncovered and facing upward, so that the row of radiators form a two dimensional array when viewed from above. Optionally, the two dimensional array forms a rectangular array of radiators. In some embodiments of the invention, the rectangle is a square with the same number of rows and columns of radiators. In some embodiments of the invention, the row elements form a single staircase of radiators. Alternatively, the row elements form 2 staircases that face each other with the lowest step of each staircase meeting in the middle. In some embodiments of the invention, each row element comprises a row of 12 or 16 radiators. Alternatively, each row element comprises 24 or 32 radiators.

There is thus provided according to an exemplary embodiment of the invention, a radar system, comprising: a phased array antenna for transmission and reception of a focused radiation beam; a circuit for providing a signal to produce a radiation beam by the phased array antenna and to control the direction of the radiation beam; wherein the radar is adapted to be mounted on a missile and scan a selected area proceeding the direction of motion of the missile. In an exemplary embodiment of the invention, the phased array antenna comprises a plurality of linear arrays each having a row of radiators on an elongated surface and an internal circuit to control the radiation pattern produced by the row of radiators; and wherein the plurality of linear arrays are positioned one on top of another in one or more cascades with the row of radiators uncovered and facing upward, so that the row of radiators form a two dimensional array when viewed from above. Optionally, the two dimensional array is a rectangular array.

In an exemplary embodiment of the invention, the rectangular array is a square array. Optionally, each radiator is controlled by 3 phase shift injection locked push push oscillators in the internal circuit. In an exemplary embodiment of the invention, each row of radiators comprises a number of radiators that is equal to two to the power of an integer number greater than 1. Optionally, each row of radiators comprises 16 radiators. In an exemplary embodiment of the invention, each row of radiators comprises 24 radiators. Optionally, each radiator is shaped as a hexagon. In an exemplary embodiment of the invention, all the row elements are provided with an identical base signal for producing the focused radiation beam. Optionally, the base signal is manipulated for each radiator to control the direction of a combined radiation beam resulting from the base signal. In an exemplary embodiment of the invention, an intermediate frequency signal is combined with the base signal to produce a radiation beam signal. Optionally, the phased array radar scans the horizon proceeding the missile to locate a target, In an exemplary embodiment of the invention, the phased array radar scans a predefined region of the horizon proceeding the missile to locate a target. Optionally, the phased array radar is adapted to follow a target during flight of the missile. In an exemplary embodiment of the invention, the phased array radar is adapted to control the motion of the missile responsive to the measurements of the radar.

BRIEF DESCRIPTION OF THE DRAWINGS

The present invention will be better understood and appreciated from the following detailed description taken in conjunction with the drawings.

Identical structures, elements or parts, which appear in more than one figure, are generally labeled with a same or similar number in all the figures in which they appear, wherein.

DETAILED DESCRIPTION

Figure 1:
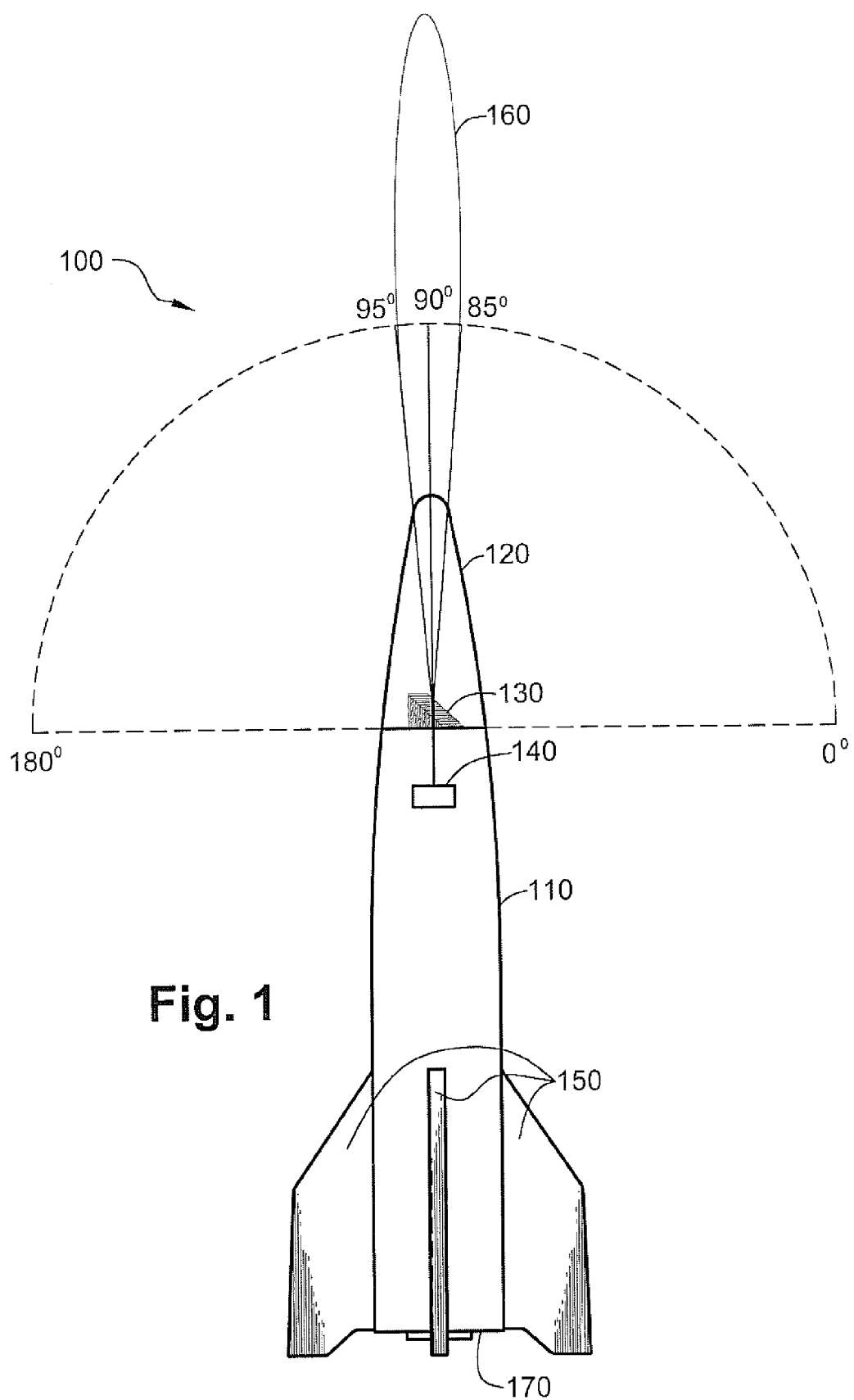
FIG. 1 is a schematic illustration of a missile using a phased array radar, according to an exemplary embodiment of the invention.

FIG. 1 is a schematic illustration of a missile 100 using a phased array radar 130, according to an exemplary embodiment of the invention. Optionally, missile 100 comprises a missile body 110, an aerodynamic missile head 120, a phased array radar 130, a control circuit 140 and an engine 170. Optionally, control circuit 140 includes a power source, for example a single use battery to provide power for activating the phased array radar. It should be noted that the power source needs to provide power for a single use and for a short term since missile 100 is generally active for a few seconds or a few minutes and then destroyed.

In an exemplary embodiment of the invention, missile 100 is launched toward a target, which is located at a distance from the launch position of the missile; optionally the range depends on the output power of the radar and the sensitivity of the radar receiving circuits. Optionally, phased array radar 130 is programmed to identify the target, for example by receiving a position before being launched or receiving instruction from an external control (e.g. by RF signals after it is launched). Once missile 100 is in the air and identifies a target, it uses phased array radar 130 to guide it toward the target. Optionally, phased array radar 130 updates control circuit 140 regarding the direction toward the target. In some embodiments of the invention, the target may be in motion relative to its original position. Alternatively or additionally, environmental factors (e.g. wind) may affect the motion of missile 100 or other considerations may require missile 100 to update its flight direction. In an exemplary embodiment of the invention, control circuit 140 receives the information from phased array radar 130 and controls the acceleration of missile 100 responsive to the information, for example by increasing or decreasing the thrust of engine 170, or by activating additional rockets 150 to fix the course of missile 100.

In an exemplary embodiment of the invention, aerodynamic head 120 is made from a material (e.g. fiberglass), which can be adapted to the antenna to reduce interference to the radar functionality to minimum, while providing an aerodynamic shape to missile 100 to reduce air resistance.

In an exemplary embodiment of the invention, phased array radar 130 is designed to form a controllable narrow focused beam 160 with a high intensity in the direction of focus and a much lower intensity in other directions, for example less than 50%, 75% or even less than 90% as compared to the intensity at the center of the beam. The focused beam is directed to a specific point or specific area in front of missile 100 or can be used to scan an azimuth and elevation of the entire horizon in the direction of motion of missile 100. In an exemplary embodiment of the invention, beam 160 is programmed so that most of the radiated power of the beam (e.g. more than 50%) is confined in a small solid angle. Optionally, the shape of the radiation beam is affected by the shape of the array and the number of radiators as described below.

Figure 2:
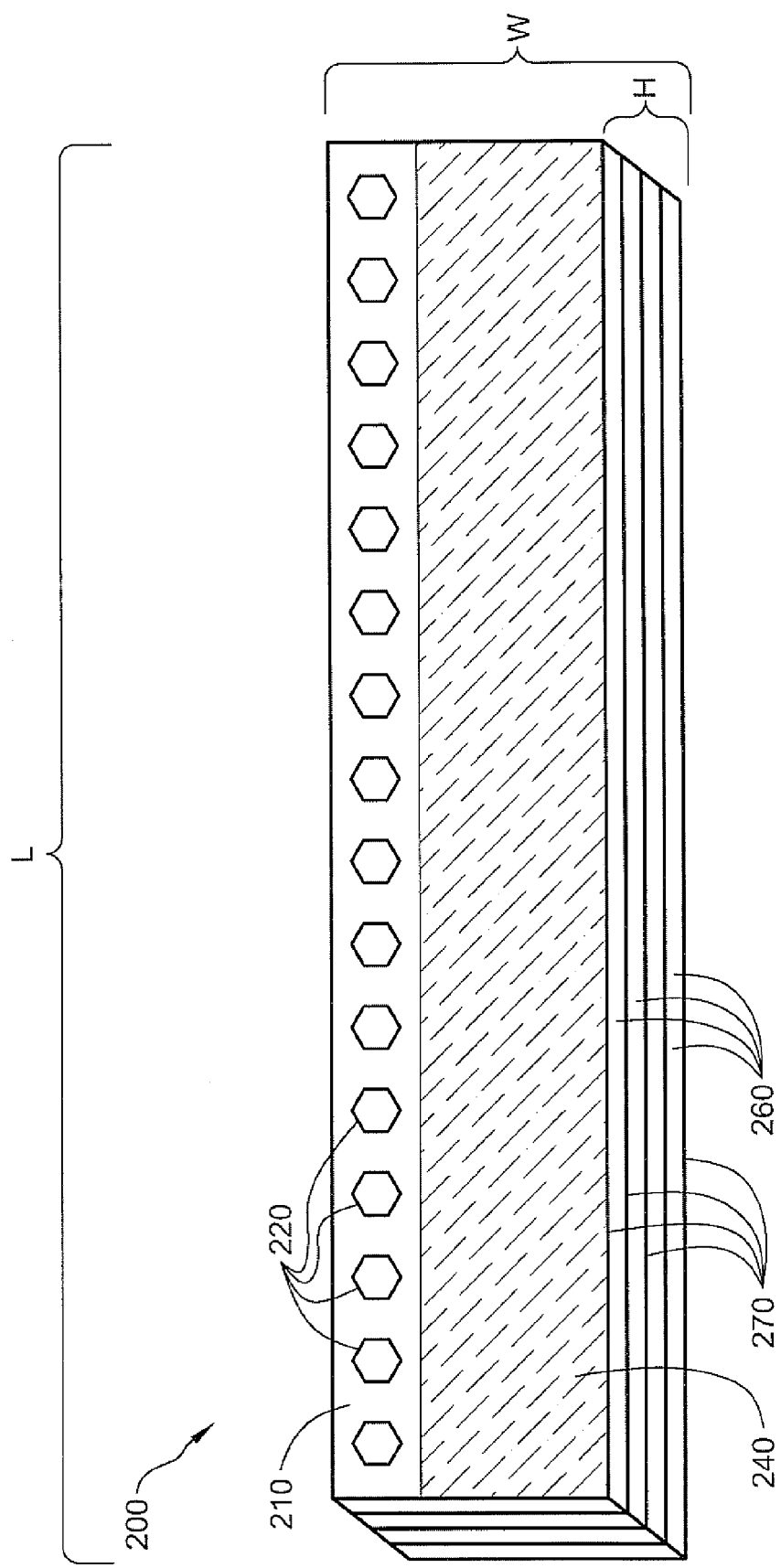
FIG. 2 is a schematic illustration of a row element for constructing a phased array radar, according to an exemplary embodiment of the invention.

FIG. 2 is a schematic illustration of a linear array 200 for constructing phased array radar 130, according to an exemplary embodiment of the invention. In an exemplary embodiment of the invention, linear array 200 is provided as a generally rectangular shaped multilayer substrate. Optionally, linear array 200 comprises a structure made up from multiple layers 260, wherein a row 210 of radiators 220 are placed on the upper side 240 of the top most layer to transmit and receive electromagnetic waves.

Figure 6:
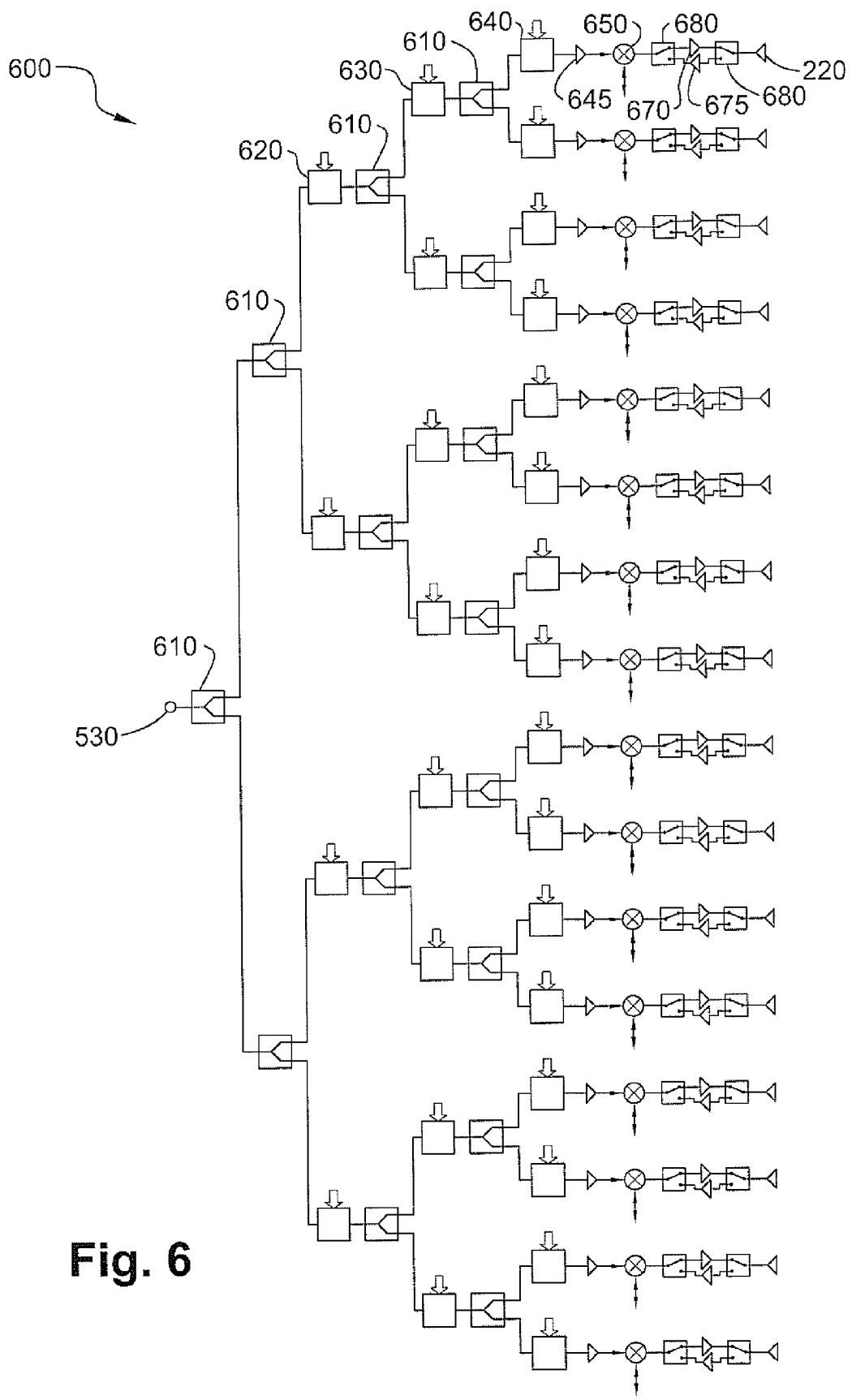
FIG. 6 is a schematic illustration of a circuit for handling the input signal of a row element, according to an exemplary embodiment of the invention.

Optionally, upper side 240 contains a circuit with monolithic microwave integrated circuit (MMIC) elements, alternatively referred to in the art as radio frequency integrated circuit (RFIC) elements, connected together (e.g. as shown in FIG. 6 and described below) to provide a local oscillator pump signal for up/down conversion. In an exemplary embodiment of the invention, the layers below upper side 240 will include bias lines and an IF manifold.

In an exemplary embodiment of the invention, radiators 220 may be provided with any shape, for example a square, a circle or a hexagon as shown in FIG. 2.

In an exemplary embodiment of the invention, a frequency of between about 20 GHz to 70 GHz is used for the radiation signal, corresponding to wavelengths of between approximately 15 mm to 4 mm in air. The optimal size for radiators 220 is typically half the wavelength, therefore the diameter of radiators 220 would be between 7.5 mm to 2 mm in air in accordance with the above wavelength range, and depending on the frequency used. In an exemplary embodiment of the invention, a row element is provided with $2^N$ radiators (wherein N is an Integer value), for example 4, 8, 16, 32, to simplify the circuit for providing the radiation signal. Alternatively, any number of radiators may be used for example 7, 12, 13, 24.

In an exemplary embodiment of the invention, the length "L" of linear array 200 with, for example 24 radiators 220 operating at a frequency of between 30-40 GHz would be approximately between 10 to 20 cm. Optionally, the width "W" would be up to the size of length "L". In some embodiments of the invention, circuits of different technologies may be used to implement linear array 200. Optionally linear array 200 is assembled to form a generally elongated rectangular shaped box in order to allow stacking of a number of linear arrays 200 as described below. Optionally, the height "H" of linear array 200 is thin, for example approximately 1 mm.

In an exemplary embodiment of the invention, multiple layers 260 are provided as dielectric layers separated by thin conductive metal layers 270 (e.g. gold). Optionally, some of metal layers 270 serve as ground layers and some of metal layers 270 serve to form the IF manifold and bias lines in linear array 200.

In some embodiments of the invention, radiators 220 are etched on the surface of the top most layer of linear array 200, or are attached as an additional layer on top of upper layer 240. Optionally, the signal for transmission may be transferred to radiator 220 by electromagnetic means, for example using an open circuited micro strip line etched on upper layer 240 directly under radiator 220.

Figure 3A:
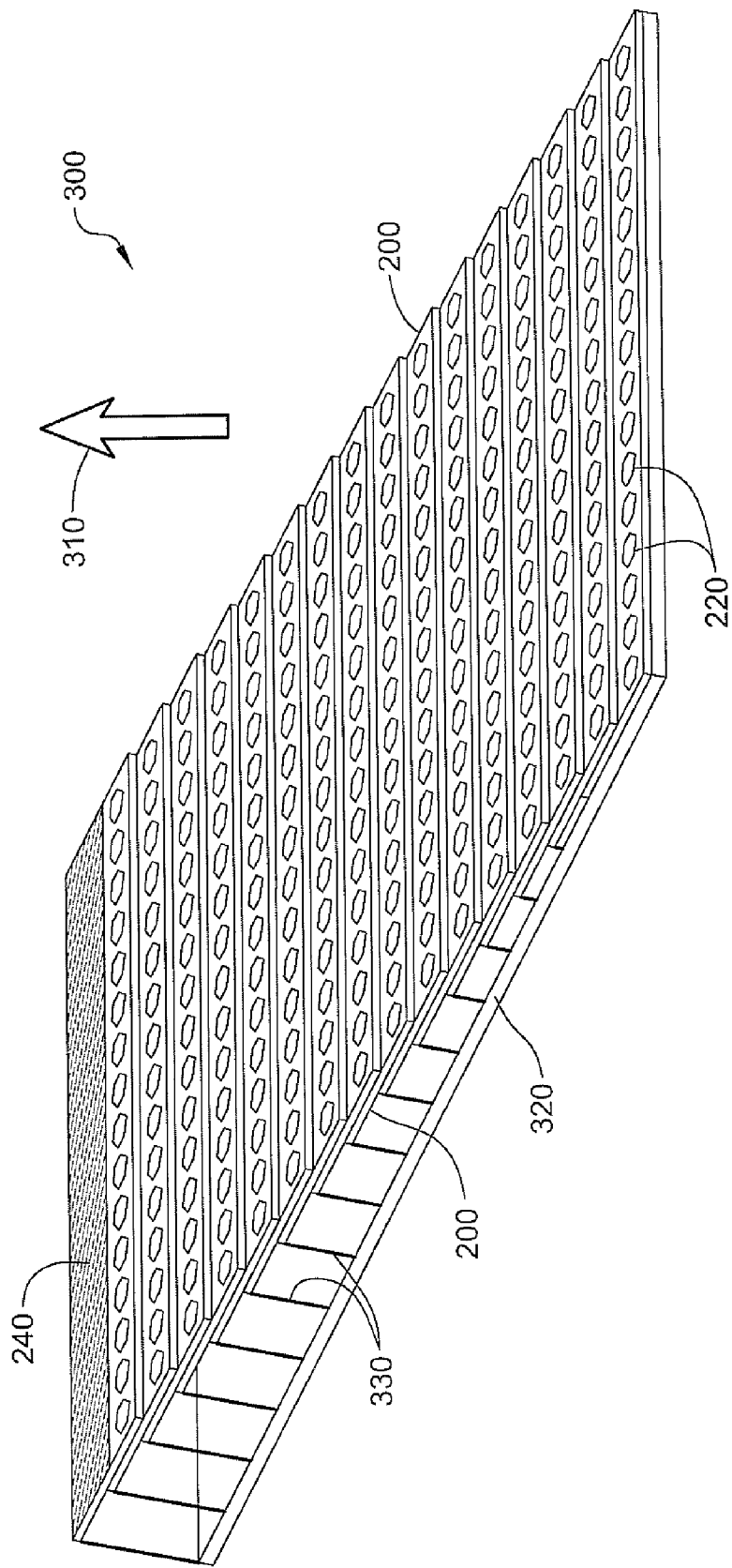
FIG. 3A is a schematic illustration of an architecture for a phased array radar, according to an exemplary embodiment of the invention.
Figure 3B:
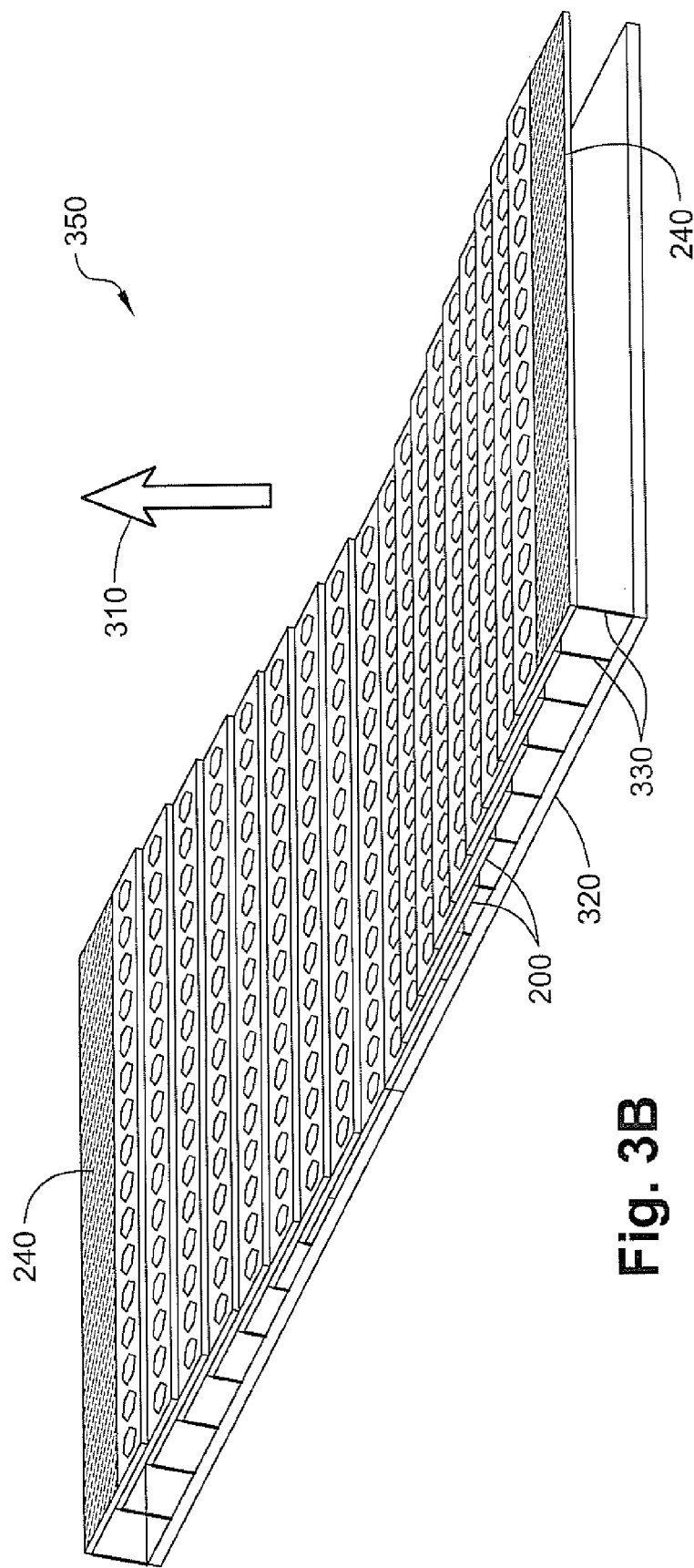
FIG. 3B is a schematic illustration of an alternative architecture for a phased array radar, according to an exemplary embodiment of the invention.

FIG. 3A is a schematic illustration of an architecture 300 for a phased array radar 130 to form a radiation beam in the direction shown by arrow 310, according to an exemplary embodiment of the invention. FIG. 3B is a schematic illustration of an alternative architecture 350 for a phased array radar 130, according to an exemplary embodiment of the invention. In an exemplary embodiment of the invention, a plurality of linear array 200 are placed one on top of another with an offset leaving row 210 of radiators 220 of each linear array 200 exposed. In an exemplary embodiment of the invention, linear arrays 200 form steps, ascending in a single direction as shown in FIG. 3A, steps ascending in two directions as shown in FIG. 3B, or descending from the center (not shown).

Figure 4:
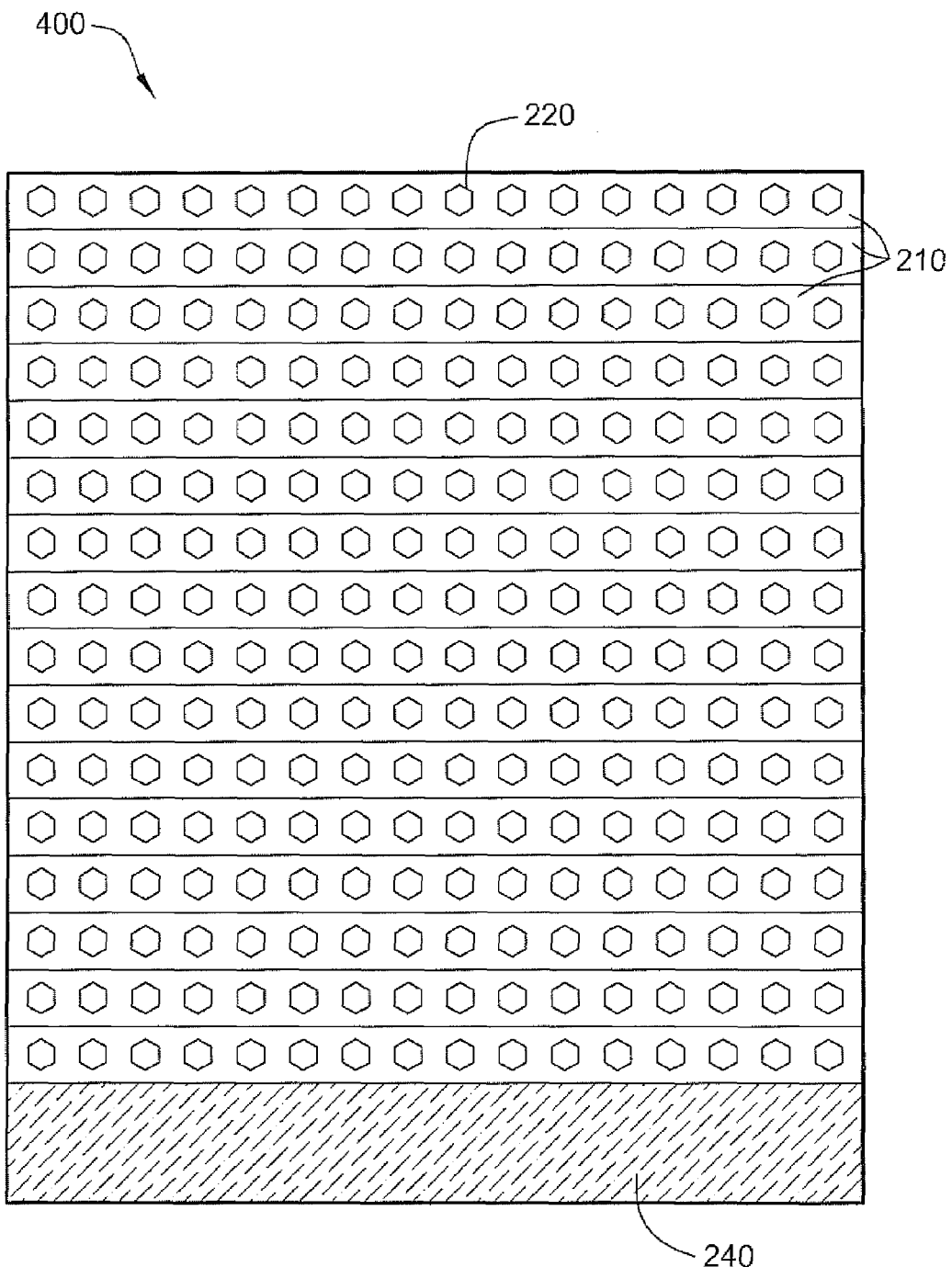
FIG. 4 is a top view of a phased array radar, according to an exemplary embodiment of the invention.

FIG. 4 is a top view 400 of a phased array radar, according to an exemplary embodiment of the invention. Optionally, the number of linear arrays 200 used to form phased array radar 130 is the same as the number of radiators 220 in each row 210, in order to form a square of radiators 220, when viewing the radiators from above, as shown by top view 400, which corresponds to architecture 300. In an exemplary embodiment of the invention, a square shaped array of radiators 220 generates a beam with identical aperture in azimuth and elevation. Alternatively, more or less linear arrays 200 may be used forming a rectangular shaped radar antenna. In an exemplary embodiment of the invention, the staircase shape of the antenna will cause a bending of the direction of the radiation beam. Optionally, this undesired effect will be corrected by control 140.

In an exemplary embodiment of the invention, if every radiator 220 of phased array radar 130 can provide 0.5 Watts of radiated power, in a array of 16×16 (=256) radiators 220 (e.g. as shown in FIG. 4), the total radiated power output will be 128 Watts In an exemplary embodiment of the invention, arrow 310 shows the default direction in which the radiation beam is propagated to scan the horizon above phased array radar 130. Optionally, the azimuth and elevation angles of the beam will be controlled by the electronic circuits that provide the radiation signal to phased array radar 130 in order to sweep the horizon or direct the beam to a specific region. In some embodiments of the invention, phased array radar 130 is provided with a base 320 (shown in FIGS. 3A and 3B) to physically support linear arrays 200 so that they retain their position to form the step architecture described above. Optionally, base 320 is molded to accommodate linear arrays 200 and physically form the geometrical shape as illustrated in FIGS. 3A and 3B.

Figure 5:
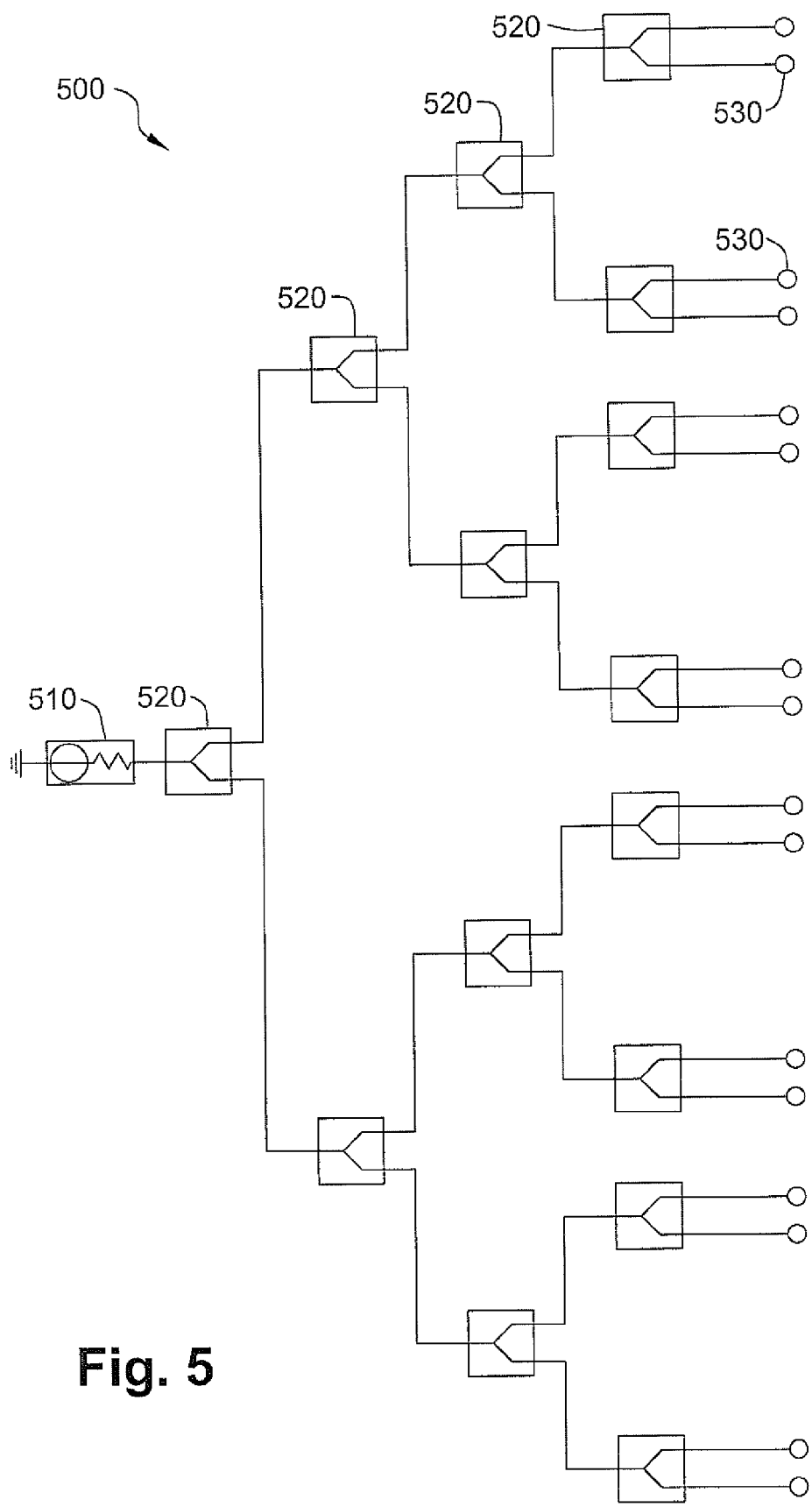
FIG. 5 is a schematic illustration of a manifold circuit for providing an input signal to multiple row elements, according to an exemplary embodiment of the invention.

FIG. 5 is a schematic illustration of a manifold circuit 500 for providing an input master oscillator signal to multiple linear arrays 200, according to an exemplary embodiment of the invention. Optionally, circuit 500 is placed in base 320 to distribute the input signals to linear arrays 200. In an exemplary embodiment of the invention, circuit 500 comprises a signal generator 510 and a cascade of dividers 520 which provide the same signal to two or more signal splitters of circuit 500 according to the number of linear arrays 200 used to implement phased array radar 130. In FIG. 5 the signal is split into two, four times thus providing the base signal to $2^4$=16 connection points 530. Optionally, dividers 520 can split the signal to different numbers (e.g. 3, 4, 5) so that other numbers of linear arrays 200 can be used, for example 12, 24, 32 or any number. In an exemplary embodiment of the invention, base 320 is connected via microwave lines 330 to each linear array 200, where it is then processed by the MMICs on upper layer 240 to supply a signal to radiators 220.

FIG. 6 is a schematic illustration of a circuit 600 for handling the radiation signal of linear array 200, according to an exemplary embodiment of the invention. Optionally, circuit 600 is embedded or encased in upper layer 240 to handle the signal provided to each radiator 220 of linear array 200. In an exemplary embodiment of the invention, circuit 600 receives the split master oscillator signal from connection point 530, and manipulates the signal to be the local oscillator pump devoted to a mixer 650. Optionally, in transmission mode mixer 650 will receive an intermediate frequency (IF) signal and up convert it to be transmitted from the mixer's respective radiator 220. Likewise in reception mode mixer 650 will down convert the signal received from its respective radiator 220 to down convert the signal to IF.

In an exemplary embodiment of the invention, the master oscillator signal from connection point 530 is passed through a tree of signal splitters 610 and phase shifted injection locked push push oscillators (PSIPPO) (620, 630, and 640) as described in the above quoted references PCT/IL2006/001144 and PCT/IL2006/001039, to produce local oscillator pump signals for each of the mixers. Optionally, splitters 610 may split the master oscillator signal to any number of branches to generate any number of local oscillator pump signals. In an exemplary embodiment of the invention, the PSIPPOs control the azimuth and elevation of the beam generated by the phased array antenna. Optionally, at a specific moment each PSIPPO is provided with a voltage defined by digitally controlled potentiometers, as described below, to control the phase of the local oscillator pump to every mixer. Optionally, the voltage provided to the PSIPPO will bias a diode internal to the PSIPPO that sets the phase of the signal. Thus at any moment the resulting radiation beam can be steered by control 140 to point to a specific direction. Optionally, by continuously changing the voltages provided to the PSIPPOs the resulting radiation signal can be steered to scan the horizon or point in a specific direction.

In an exemplary embodiment of the invention, two mode selectors 680 are used simultaneously to select at a given moment between transmission mode (TX), wherein a signal is transmitted from radiators 220, and reception mode (RX), wherein a signal is received by radiators 220. Optionally, in transmission mode the local oscillator pump passes through an amplifier 645 to mixer 650. In an exemplary embodiment of the invention, the IF signal (e.g. provided by an I/Q mixer) is provided to mixer 650 to be up converted by the mixer pumped by the local oscillator pump. In an exemplary embodiment of the invention, the up converted signal, is amplified by an upward amplifier 670 and provided to radiator 220 to be radiated out.

In reception mode, the signal received by radiators 220 is provided to a downward amplifier 675 to be amplified. Optionally, at mixer 650 the received signal is down converted by the mixer to generate the IF signal.

Figure 7A:
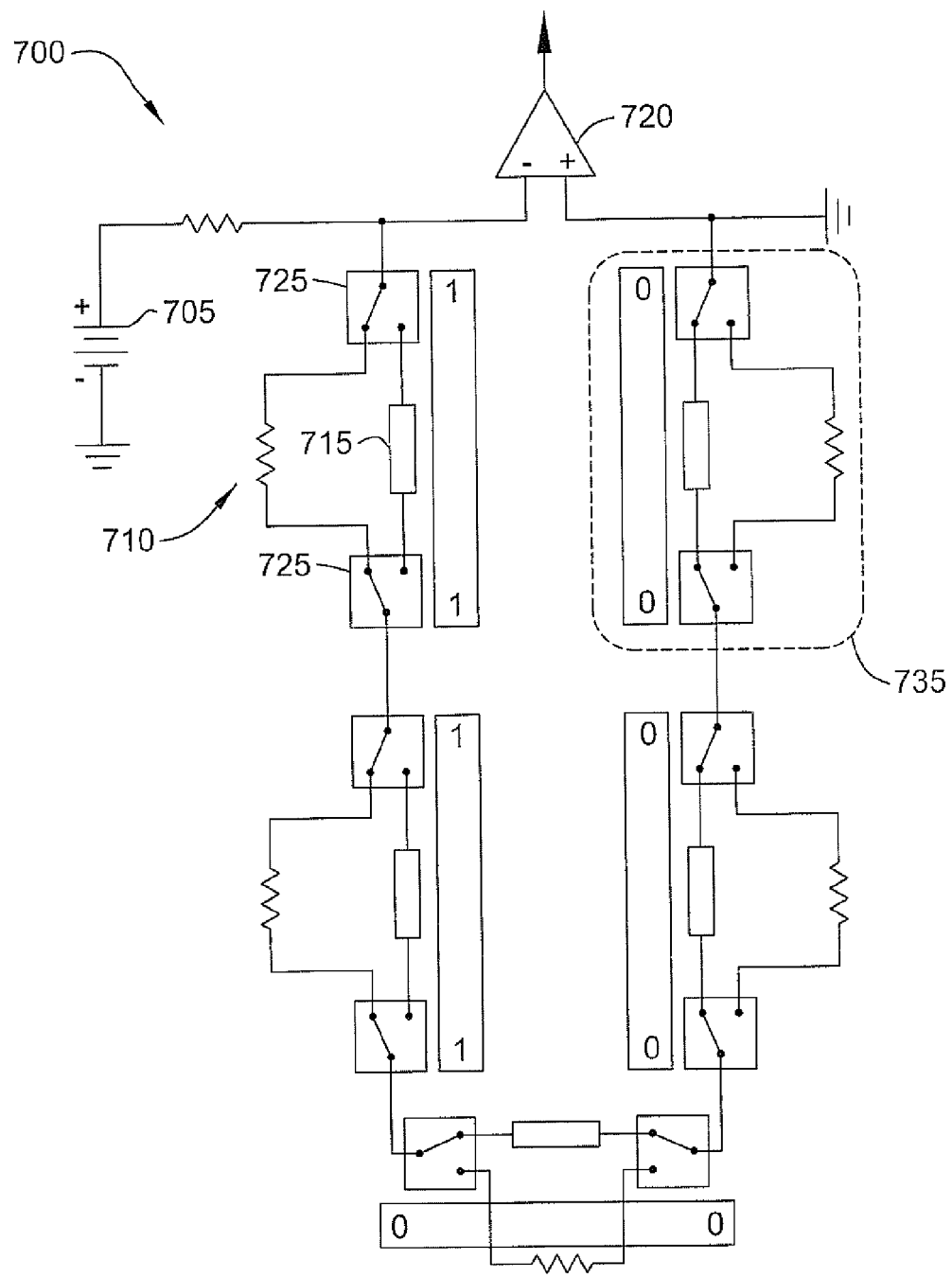
FIG. 7A is a schematic illustration of a digitally controlled potentiometer circuit for generating a voltage based on a 5 bit value, according to an exemplary embodiment of the invention.
Figure 7B:
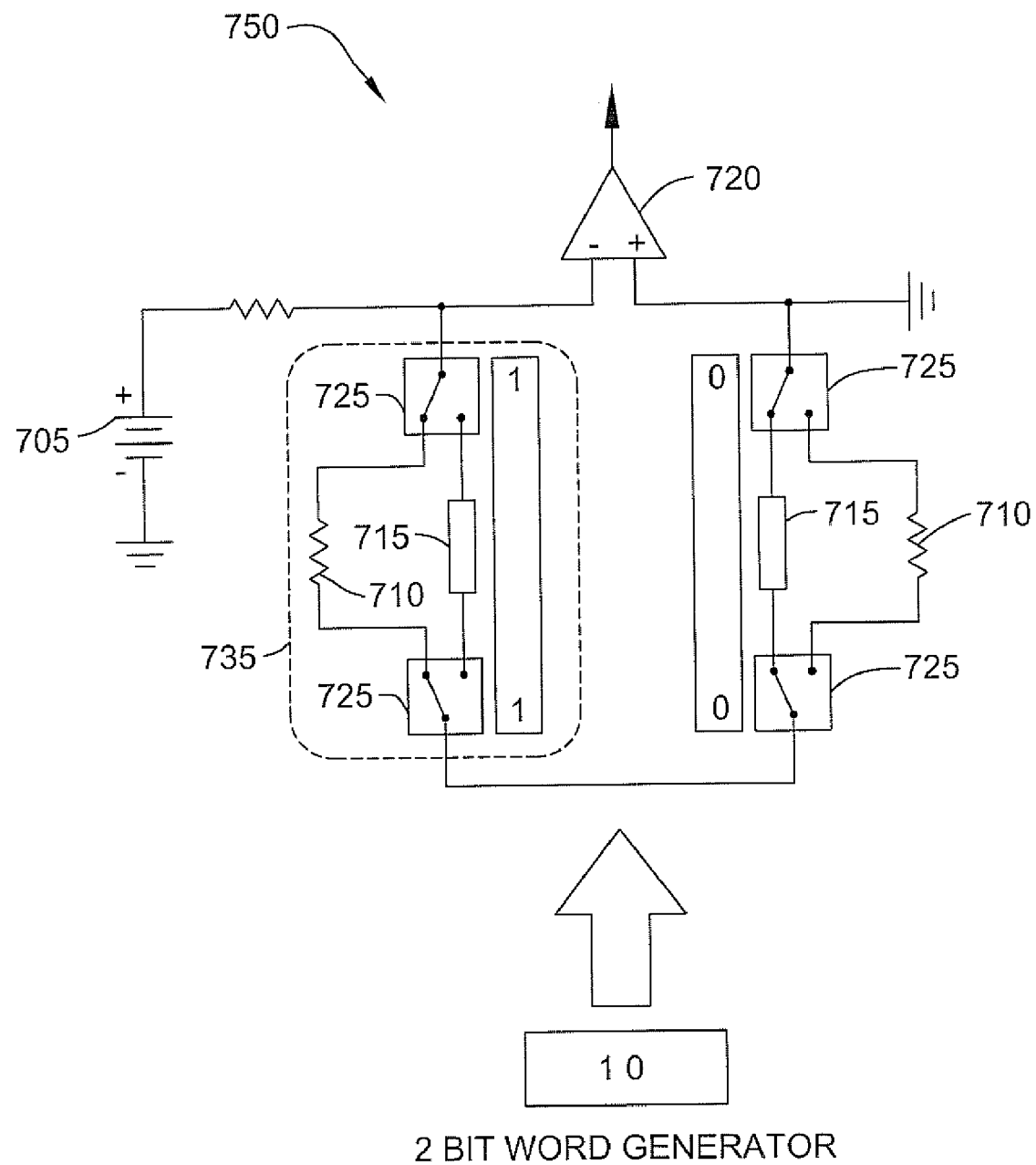
FIG. 7B is a schematic illustration of a digitally controlled potentiometer circuit for generating a voltage based on a 2 bit value, according to an exemplary embodiment of the invention.

In an exemplary embodiment of the invention, control 140 will control the direction of the resulting radiation beam by providing binary bit sequences to indirectly affect the PSIPPO. FIG. 7A is a schematic illustration of a digitally controlled potentiometer circuit 700 for generating a voltage based on a 5 bit word, according to an exemplary embodiment of the invention; and FIG. 7B is a schematic illustration of a digitally controlled potentiometer circuit 750 for generating a voltage based on a 2 bit word, according to an exemplary embodiment of the invention. In an exemplary embodiment of the invention, a voltage is provided from a voltage source 705 to a network of sub blocks 735. Each sub block 735 includes a resistor 710 in parallel to a short circuit 715 and mode selectors 725. The voltage at an operational amplifier 720 is the sum of the voltages provided by the sub blocks 735. Optionally, when a value of "0" is provided to sub block 735, mode selectors 725 select short circuit 715 and the sub block 735 and the contribution of the sub block 735 is null. Optionally, when a value of "1" is provided to the bit circuit, mode selector 725 selects the resistor and the contribution of the sub block 735 is determined by the voltage across resistor 710. Optionally, resistors 710 have different values for each sub block 735 so that circuit 700 with 5 bit circuits will have 32 (2 to the power of 5) distinct voltage values that are selected responsive to the 32 possible 5 bit sequences. In some embodiments of the invention, a "0" value may select resistor 710 and a "1" value may select short circuit 715. Similar to circuit 700, circuit 750 with 2 bit circuits provides 4 (2 to the power of 2) distinct voltage values.

Figure 7C:
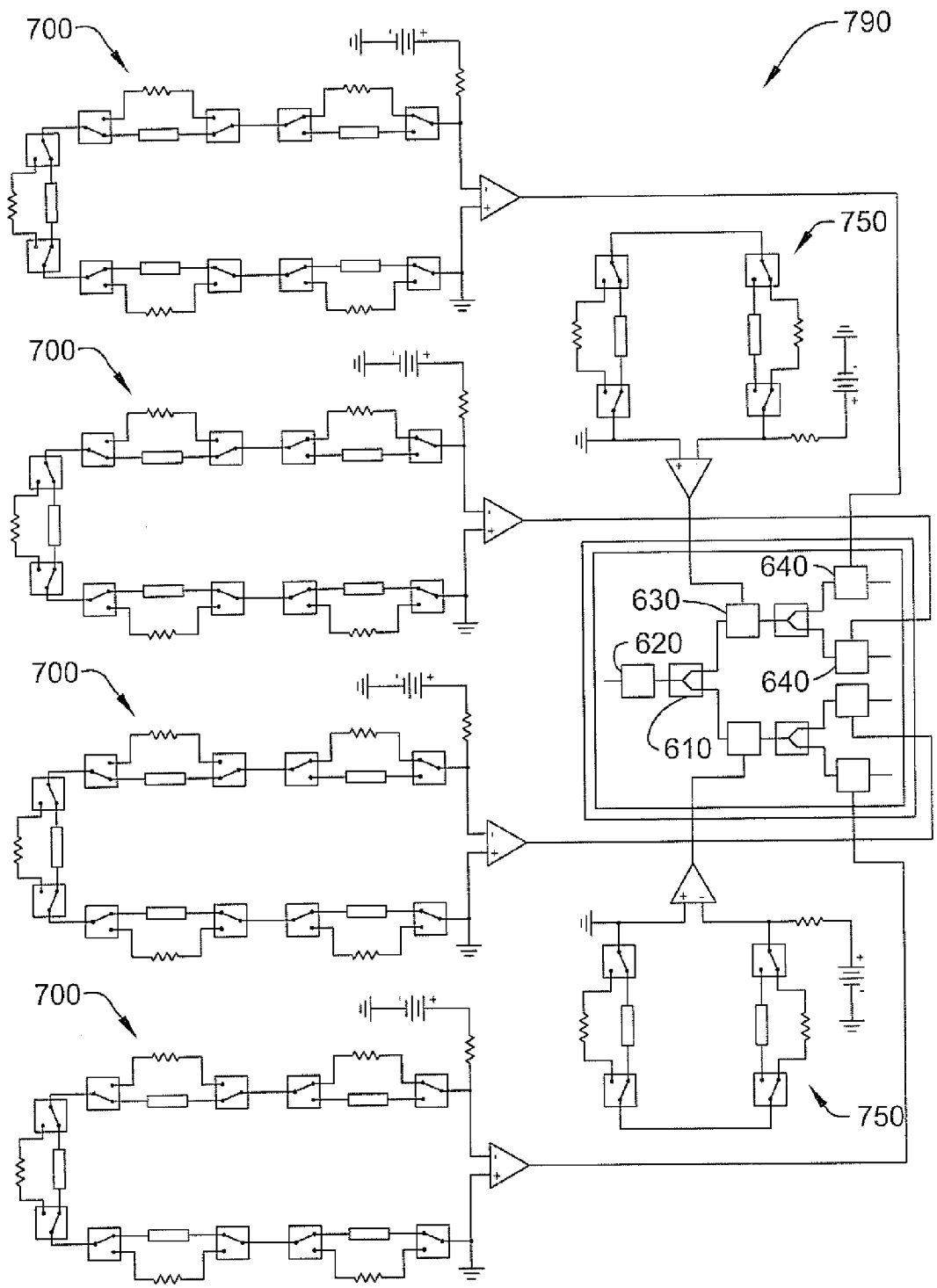
FIG. 7C is a schematic illustration of a circuit incorporating voltage generators to control the direction of a radiated beam, according to an exemplary embodiment of the invention.

FIG. 7C is a schematic illustration of a circuit 790 incorporating digitally controlled potentiometer circuits (700, 750) to control the direction of a radiated signal, according to an exemplary embodiment of the invention. In an exemplary embodiment of the invention, circuit 790 incorporates digitally controlled potentiometer circuits such as circuit 700 and circuit 750 to bias the diodes in the PSIPPOs shown in FIG. 6 (e.g. 620, 630, and 640). Optionally, control 140 provides a binary bit sequence to the digitally controlled potentiometer circuits (700, 750) and the digitally controlled potentiometer circuits provide a distinct voltage value to the diodes in the PSIPPOs. Optionally, as shown in FIG. 7C 5 bit digitally controlled potentiometer circuit 700 is used to bias the diodes of PSIPPO 640 and 2 bit digitally controlled potentiometer circuit 750 is used to bias the diodes of PSIPPO 630. Optionally, the digitally controlled potentiometer circuits of circuit 790 are placed on one or more of the layers of linear array 200 and connected to the diodes of PSIPPOs 620, 630 and 640 of circuit 600. In some embodiments of the invention, control 140 provides each linear array 200 with a single extended binary bit sequence, which is divided up between the digitally controlled potentiometer circuits to control the direction of the radiation beam.

Figure 8:
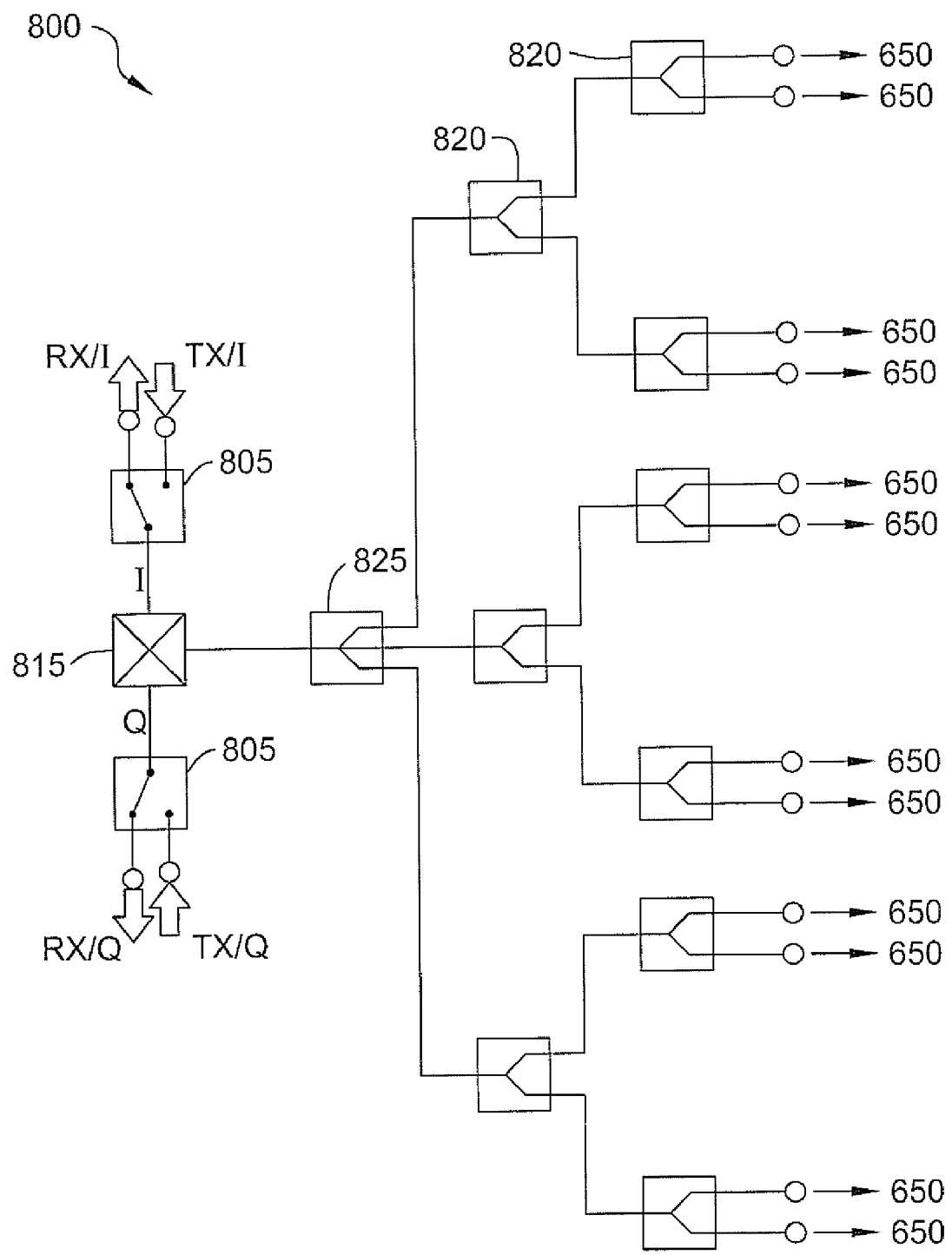
FIG. 8 is a schematic illustration of a circuit for up and down converting the I and Q components of a baseband signal, according to an exemplary embodiment of the invention.

FIG. 8 is a schematic illustration of a circuit 800, according to an exemplary embodiment of the invention. In an exemplary embodiment of the invention, Circuit 800 alternately selects between an up link mode and a down link mode depending on the position of switches 805. Optionally, in up link mode TX/I and TX/Q (the baseband transmission I/Q components of the signal) enter I/Q mixer 815 for up conversion to generate an IF signal. The IF signal is divided by a network of signal splitters 820 and 825 to be provided to each mixer 650 (FIG. 6).

In an exemplary embodiment of the invention, in down link mode the signal provided by mixers 650 (shown in FIG. 6) enter the network of signal splitters (820, 825) and are summed up to be provided to I/Q mixer 815. Optionally, the signal is then down converted by I/Q mixer 815 to be provided as RX/I and RX/Q (the reception I/Q components of the signal).

In an exemplary embodiment of the invention, block 810 is positioned in one of the layers of linear array 200. Optionally, switches 805 operate in coordination with selectors 680, so that the I/Q signal will be available for transmission and for process when received. Optionally, the digital information for setting the receiving status or transmitting status is provided by control 140.

In an exemplary embodiment of the invention, signal splitters 820, 825 may split the signal to two or more branches, for example as shown in FIG. 8, wherein signal splitter 820 splits the signal to two branches, and signal splitter 825 splits the signal to three branches. It should be noted that circuit 800 exemplifies splitting the signal to 12 branches and circuit 600 exemplifies a case with 16 branches to show that different numbers of branches may be used as explained above. However in a specific case the number of branches in circuit 600 and circuit 800 should match.

The presence of a PSIPPO 620, 630, and 640 at three levels of circuit 600 allows directing (e.g. controlling elevation and azimuth of the radiation beam) and shaping of the radiation beam pattern produced by each linear array 200 and by the entire phased array radar 130. Optionally, as described above control 140 provides a sequence of binary bit values to some or all of PSIPPO 620, 630, and 640 to direct the radiation beam, sharpen the resulting beam and reduce the side lobes of the radiation pattern. In an exemplary embodiment of the invention, the beam may be directed like a CRT beam forming a picture of a television to scan the horizon. Alternatively, other algorithms can be used to maximize coverage and minimize the time required to scan the horizon. In some embodiments of the invention, other radar systems (e.g. located on the ground) may assist in pinpointing the threats and reducing the area phased array radar 130 is required to scan. Optionally, phased array radar 130 will be provided with general co-ordinates of the threat and phased array radar 130 will be required to locate the threat more accurately and/or follow its motion during flight on missile 100.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the invention. Further combinations of the above features are also considered to be within the scope of some embodiments of the invention.

It will be appreciated by persons skilled in the art that the present invention is not limited to what has been particularly shown and described hereinabove. Rather the scope of the present invention is defined only by the claims, which follow.

The invention claimed is:

1. A radar system, comprising:
    a phased array antenna for transmission and reception of a focused radiation beam;
    a circuit for providing a signal to produce a radiation beam by the phased array antenna and to control the direction of the radiation beam;
    wherein said radar is adapted to be mounted on a missile and scan a selected area proceeding the direction of motion of the missile;

wherein said phased array antenna comprises a plurality of linear arrays each having a row of radiators on an elongated surface and an internal circuit to control the radiation pattern produced by the row of radiators; and wherein said plurality of linear arrays are positioned one on top of another in one or more cascades with the row of radiators uncovered and facing upward, so that the row of radiators form a two dimensional array when viewed from above.

2. A radar system according to claim 1, wherein said two dimensional array is a rectangular array.

3. A radar system according to claim 2, wherein said rectangular array is a square array.

4. A radar system according to claim 1, wherein each radiator is controlled by 3 phase shift injection locked push push oscillators in said internal circuit.

5. A radar system according to claim 1, wherein each row of radiators comprises a number of radiators that is equal to two to the power of an integer number greater than 1.

6. A radar system according to claim 1, wherein each row of radiators comprises 16 radiators.

7. A radar system according to claim 1, wherein each row of radiators comprises 24 radiators.

8. A radar system according to claim 1, wherein each radiator is shaped as a hexagon.

9. A radar system according to claim 1, wherein all the row elements are provided with an identical base signal for producing the focused radiation beam.

10. A radar system according to claim 1, wherein a base signal is manipulated for each radiator to control the direction of a combined radiation beam resulting from the base signal.

11. A radar system according to claim 10, wherein an intermediate frequency signal is combined with said base signal to produce a radiation beam signal.

12. A radar system according to claim 1, wherein said phased array radar is programmed to scan the horizon proceeding the missile to locate a target.

13. A radar system according to claim 1, wherein said phased array radar is programmed to scan a predefined region of the horizon proceeding the missile to locate a target.

14. A radar system according to claim 1, wherein said phased array radar is adapted to follow a target during flight of the missile by tracking the location of the target and controlling the acceleration of the missile responsive to the location.

15. A radar system according to claim 1, wherein said phased array radar is adapted to control the motion of the missile responsive to the measurements of the radar by increasing or decreasing the thrust of the missile or activating additional rockets.

* * * * *